(12) United States Patent
Orban et al.

(10) Patent No.: US 6,260,656 B1
(45) Date of Patent: Jul. 17, 2001

(54) LAND SEISMIC DATA ACQUISITION METHOD AND SEISMIC CABLE AND CABLE SPOOL VEHICLE THEREFOR

(75) Inventors: Jacques Joseph Henri Orban, Jar (NO); Andreas Wolfgang Laake, Kingston upon Thames (GB); Irene Gabler, Paris (FR)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 09/277,770

(22) Filed: Mar. 29, 1999

Related U.S. Application Data

(63) Continuation-in-part of application No. PCT/GB97/02544, filed on Sep. 25, 1997.

(30) Foreign Application Priority Data

Sep. 30, 1996 (GB) .................................................. 9620391

(51) Int. Cl.⁷ ...................................................... G01V 1/16
(52) U.S. Cl. ........................................... 181/112; 367/191
(58) Field of Search .............................. 702/14; 367/191, 367/16, 19, 20; 181/401, 112, 120, 122; 340/17 R, 17

(56) References Cited

U.S. PATENT DOCUMENTS

| | | | | |
|---|---|---|---|---|
| 2,990,904 | * | 7/1961 | Hawkins et al. | 181/112 |
| 3,921,755 | * | 11/1975 | Thigpen | 181/122 |
| 3,923,121 | | 12/1975 | Kruppenbach | 181/112 |
| 3,930,219 | | 12/1975 | Kostelnicek | 340/17 |
| 3,954,154 | * | 5/1976 | Kruppenbach et al. | 181/112 |
| 4,041,444 | | 8/1977 | Carter | 340/15.5 |
| 4,066,993 | | 1/1978 | Savit | 340/15.5 |
| 4,320,472 | | 3/1982 | Fort | 367/79 |
| 4,372,420 | * | 2/1983 | White | 181/120 |
| 4,398,276 | * | 8/1983 | Kruppenbach | 367/191 |
| 4,998,227 | | 3/1991 | Rygg et al. | 367/177 |
| 5,747,754 | * | 5/1998 | Svenning et al. | 181/401 |

FOREIGN PATENT DOCUMENTS

| | | |
|---|---|---|
| 2729905 | 1/1978 | (DE) . |
| 0677753 | 10/1995 | (EP) . |
| 1584303 | 2/1981 | (GB) . |
| 1584304 | 2/1981 | (GB) . |
| 1056098 | 1/1982 | (RU) . |
| 1117549 | 2/1983 | (RU) . |
| 1260892 | 12/1983 | (RU) . |
| 1242877 | 1/1985 | (RU) . |
| 2018881 | 4/1991 | (RU) . |

* cited by examiner

*Primary Examiner*—Christine Oda
*Assistant Examiner*—Victor J. Taylor
(74) *Attorney, Agent, or Firm*—Jacobson Holman PLLC

(57) ABSTRACT

A method for land seismic data acquisition is provided, together with a seismic cable and a cable spool vehicle for use in the method. In performing the method, the cable spool vehicle mechanically deploys seismic cable with attached sensors according to a desired geophysical spread and at a rate dependent upon the speed of movement of the vehicle substantially without tension in the cable. The cable spool vehicle also allows mechanical pick-up of the seismic cable together with the sensors after the seismic data acquisition.

26 Claims, 2 Drawing Sheets

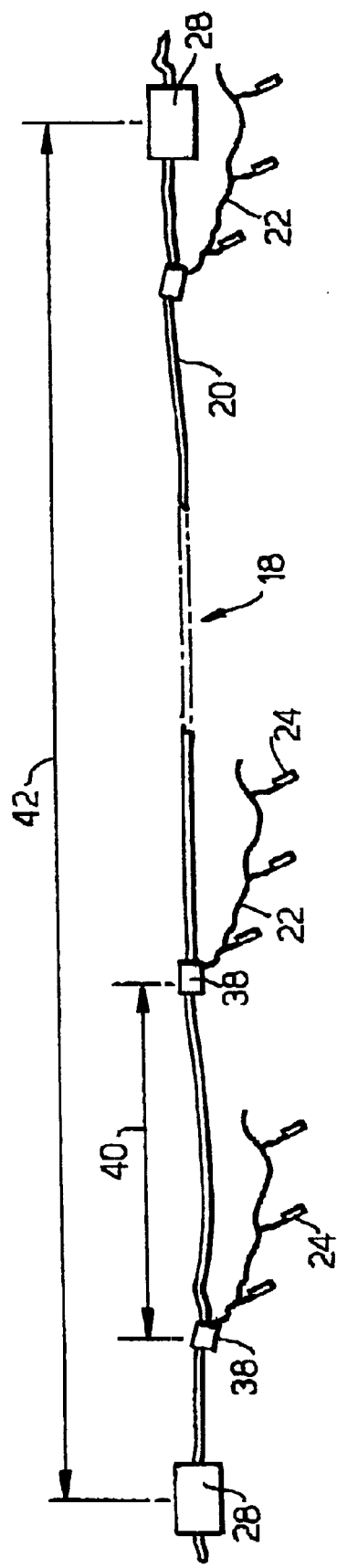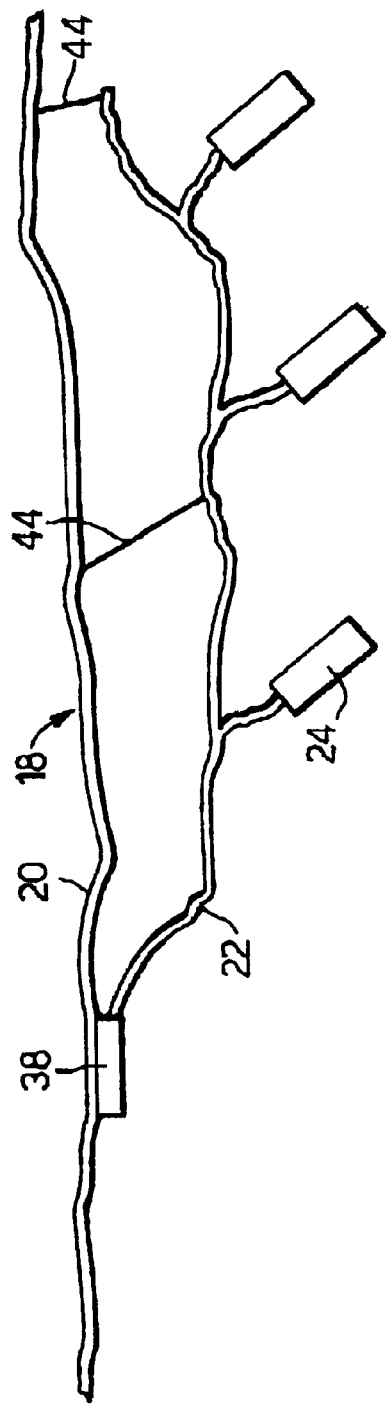

LAND SEISMIC DATA ACQUISITION METHOD AND SEISMIC CABLE AND CABLE SPOOL VEHICLE THEREFOR

This is a continuation-in-part of International Application Number PCT/GB97/02544, filed Sep. 25, 1997, which claims the benefit of GB Application Number 9620391.4, Sep. 30, 1996.

BACKGROUND OF THE INVENTION

1. Field of the Invention

The present invention relates to a method of performing land seismic data acquisition, and a seismic cable and a cable spool vehicle therefor. More particularly, the invention relates to a method and apparatus for mechanically deploying seismic cable with attached sensors according to a desired geophysical spread and for allowing subsequent mechanically pick-up of the seismic cable together with the sensors.

2. Description of the Prior Art

In most conventional land seismic data acquisition, individual analog seismic sensors, so-called geophones, typically having one or more spikes attached to their cases, are planted in groups in the ground with the center of gravity of the group along a seismic survey line. In order to ensure a proper and stable acoustical coupling of the geophones with the ground, each geophone is normally driven into the soil by a vigorous blow on its top applied by a seismic crew member. Before the planting of each geophone, the crew member has to estimate the desired proper position (with respect to geophysical requirements) for the geophone, which is usually realized by simple visual estimation of the geophone position versus a survey peg placed in the center of gravity of the geophone group. Additionally, the crew member has to plant the geophone so that it is vertical. Grouping the analog output signals of a certain number of geophones and adding their output signals permits the noise signals that are normally superimposed on the seismic signal, such as the horizontally traveling wave (ground roll) and various types of random, incoherent noise (e.g. wind, rain, scratching of the geophone caused by moving plants, oscillation of the geophone cable) to be significantly reduced. Each such group of geophones is connected to seismic data acquisition and recording units.

Conventional land seismic data acquisition demands a large number of geophones and cables, together with a large crew and considerable logistics, to lay out the desired geophysical spread and to pick it up again after the seismic survey. Such operations are very time consuming and very expensive.

In order to reduce the setting up time expense of land seismic data acquisition, in particular the number of crew members required, it has been proposed in the past to apply a marine seismic survey technology, (i.e., streamer technology), to land seismic operations. Here, a multiplicity of sensors are arranged in a line and, instead of being "statically" laid out by being individually planted, are dragged over the ground along a desired seismic survey line.

One such known land seismic streamer comprises a flat band-like device with incorporated interconnected single-component analog geophones, which, like a marine streamer, was towed by a vehicle, and dragged over ground covered with snow and ice. On the one hand, the flatness of this streamer helped to avoid turning over the streamer and to keep the geophones in a proper upright position. On the other hand, the required good acoustical coupling of the streamer to the ground surface could not be reliably achieved. The flat streamer, because of being dragged and stretched, could not properly follow the contours of the ground, and tended to be drawn over the high points of the ground and to remain stretched without touching the low-erpoints. Furthermore, the flat streamer was very sensitive to wind, which caused significant noise that became superimposed on the desired seismic signal. Another drawback of the flat streamer was that its sensors were incorporated into more or less flexible band sections that alternated with stress compensating members. Replacement of a defective geophone required the replacement of a complete streamer section, a costly action. It is also evident that when such a streamer is pulled and dragged over a dry ground surface, (ie sharp-edged stones, sand grains etc), it will be heavily affected by abrasion effects and, in the case of sand, by electrostatic effects.

Another prior art land streamer device comprises a main cable with integrated stress compensation members that is also towed behind a vehicle and dragged over the ground. Unlike the aforementioned flat cable streamer, this other streamer did not contain geophones that were mounted as part of the main cable, but rather geophones that were attached to additional secondary cables connected to the main cable via outlet connectors at regular intervals. In order to compensate for improper sensor orientation, the geophones used in this streamer were single component gimbal-mounted analog sensors. But such geophones only allow compensation for a single axis inclination. And the drawbacks of such a towed land streamer are evident. This streamer too does not always follow the surface contours, or lay properly on the ground or provide sufficient acoustical coupling. Dragging such a streamer over pebbly or rocky ground risks getting it stuck at any restriction in its way. A stuck but still pulled streamer may easily be damaged, destroyed or become a danger for personnel in the field if it unexpectedly frees itself because of the pulling force. The useful life of such a steamer is also very short in view of the abrasion caused by dragging it over the ground.

SUMMARY OF THE INVENTION

It is therefore an object of the present invention to provide an improved method for carrying out land seismic data acquisition that avoids at least some of the above described drawbacks of conventional land streamer technology.

According to a first aspect of the present invention, there is provided a land seismic data acquisition method comprising the following steps:

a) in a desired spread for a seismic data acquisition, selecting a least one section of a desired seismic survey line and positioning a cable spool vehicle, which has a cable drum whereon a seismic cable with attached seismic sensors is spooled, at one end of the desired section of seismic survey line, and laying a free end of the cable on the ground;

b) moving the cable spool vehicle along the desired seismic survey line while revolving the drum to let the seismic cable with attached seismic sensors unspool from the drum in such a way that the cable is laid on the ground substantially free of tension; and c) transmitting acoustic signals into the ground, acquiring the resulting seismic signals with the seismic sensors, and recording the acquired seismic signals in digital form;

said method preferably including one or more of the following further steps:

d) after having finished laying out the seismic cable and attached sensor, stopping the cable spool vehicle and disconnecting the laid out cable from the drum or from cable that still remains on the drum;

e) if necessary, connecting laid-out seismic cable to a least one other laid-out seismic cable on the same seismic survey line or to another laid-out cable along another desired seismic survey line;

f) continuing to lay out seismic cables as in steps a) and b) to complete the desired seismic spread, and interconnecting all the cables to further seismic data acquisition units, such as data recorder means and/or data processing means;

g) driving a cable spool vehicle to a selected seismic cable and disconnecting the selected cable from any adjacent cable and/or from any seismic data acquisition units; and h) spooling the disconnected cable onto the drum of the seismic spool vehicle while moving the vehicle along the desired seismic survey line. According to other aspects of the invention, there is provided both a seismic cable for use in the land seismic data acquisition method of the preceding paragraph, the cable comprising at least one main cable and several outlet cables attached to said main cable at intervals, each one of said outlet cables connecting at least one digital seismic sensor to the main cable, as well as a cable spool vehicle for carrying out the method, the vehicle comprising a drum, and a drum driving mechanism that selectively drives the drum backwards and forwards in order to unspool seismic cable off the drum and to respool seismic cable onto the drum, in which the revolving motion of the drum is controlled and co-ordinated in dependence upon the forward motion of the vehicle.

The major advantage of the method for carrying out land seismic data acquisition according to the invention is that is allows seismic sensors to be placed on the ground without any stress or tension in the seismic cable. Applying this inventive method to the seismic cable according to the invention, in co-operation with the inventive cable spool vehicle, allows proper acoustic coupling of the sensors to the ground to be easily achieved. No dragging action on the seismic cable it involved, thus reducing abrasion and other forms of damage. The digital sensors used in performing to the invention permit compensation for the orientation of the sensors.

More advantageous elements and details of the invention are defined in the claims and will be explained in the following description;

BRIEF DESCRIPTION OF THE DRAWINGS

The present invention will be better understood from the following detailed description when taken in conjunction with the attached drawings, of which:

FIG. 2 is a schematic top view of a first embodiment of a seismic cable according to the invention, laid out for a seismic survey; and FIG. 3 shows a more detailed top view of part of the cable of FIG. 2, with an attached group of seismic sensors.

DETAILED DESCRIPTION OF A PREFERRED EMBODIMENT OF THE INVENTION

Figure 1:
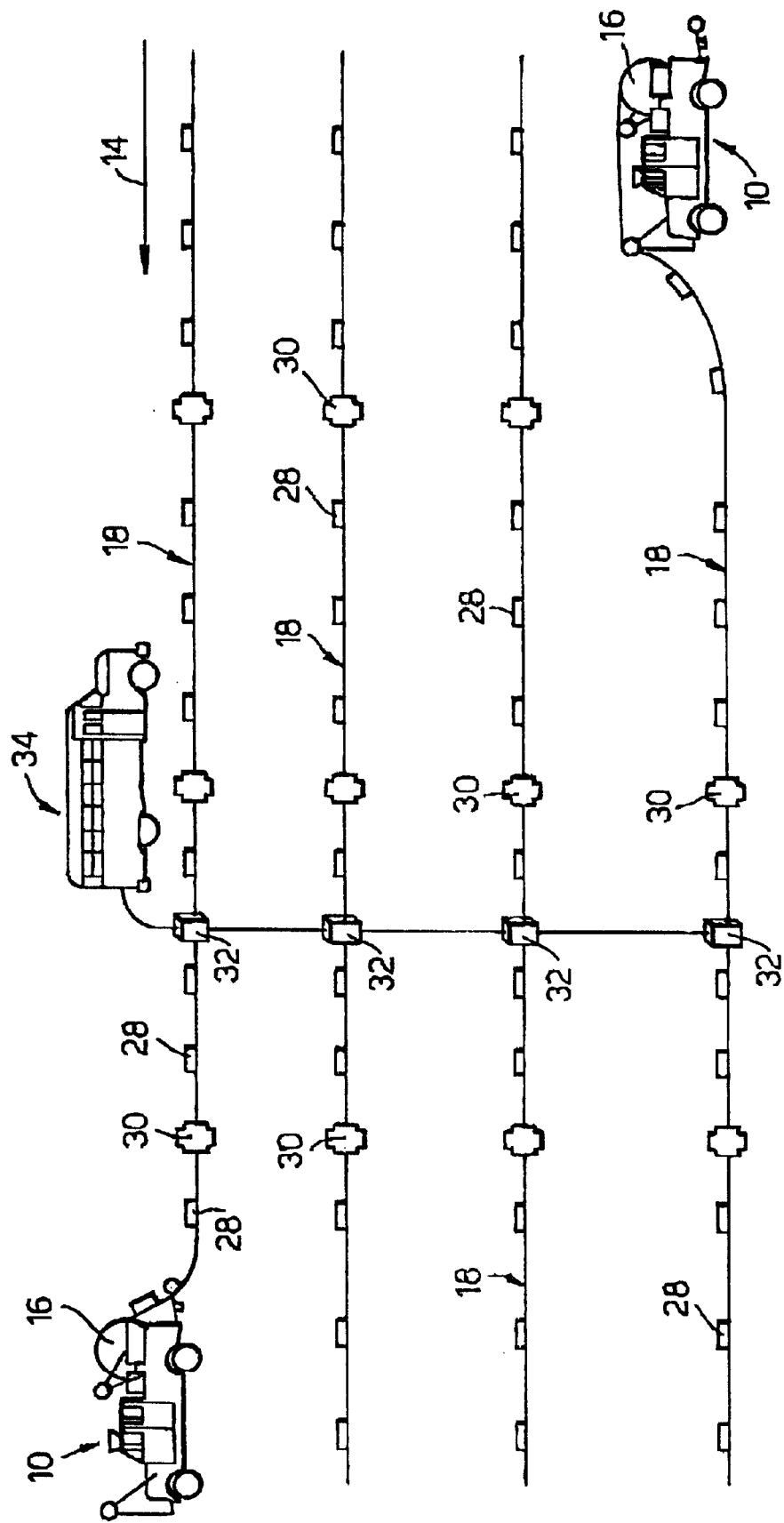
FIG. 1 is a schematic and simplified plan of a seismic survey spread with seismic cable laid out by a method according to the invention.

In FIG. 1, a schematic and simplified plan of a seismic survey spread illustrates how seismic cable is laid out (and picked up again) according to the invention.

A seismic cable spool vehicle 10 (in FIG. 1 this the upper vehicle) is moved to a desired seismic survey line 14. In FIG. 1 the cable spool vehicle 10 is shown as a self-propelled vehicle, but without limiting the invention this vehicle may also be trailer or the like that is pulled by another type of vehicle. A cable drum 16 mounted on the cable spool truck 10 contains seismic cable 18 (see also FIGS. 2 and 3). A full standard drum 16 preferable carried about 2–2.5 km of cable, but other drum sizes are possible if needed. The whole seismic cable 18 on the drum 16 is not made up of a single cable over its total length, but comprises multiple inter-connectable seismic cable segments each of an individual length of preferably about 200–300 m. The cable segments may be connected directly to each other or by means of telemetry unit 28 that will be described later. This allows tailoring the cable 18 for the desired seismic survey line 14 and/or easy replacement of a (relatively short) cable segment that is damaged or otherwise out of order. Even in areas where the cable spool vehicle 10 cannot be easily moved, the cable segments are handy and lightweight enough to be transported and laid out by seismic crew members in the conventional way.

Prior art land streamer systems have typically transmitted analog output signals through the cable and this required dozens or hundreds of internal wire pairs to be incorporated within the cable (typically one pair of wires for each sensor or "hardwired" sensor group). Because these systems were intended to be dragged or towed, the cable were also typically armored or sheathed to protect their internal electronic components and would contain tension members, such as steel wires or polyamide fibers, that were designed to survive substantial tensional forces, such as 8 tons of force. These prior art cables were therefore generally quite heavy, often substantially exceeding 0.4 Kg per meter cable.

By using a digital data telemetry system, the number of the wire pairs needed within the cable were able to be reduced substantially, from dozens or hundreds to only a few, such as 7 pairs. By deploying the cable in a tension free manner, the need for armoring, sheathing, or tension members within the cable was eliminated. These changes have allowed the weight of the present cable to be substantially reduced, to aproximately 0.1 Kg per meter of finished cable. The strength of the cable has been similarly reduced; the cable may only survive tensional forces of 50–100 Kgs, but this does not create a problem because the cable is not designed to be dragged. This reduction in per meter cable weight has allowed relatively long cable segments (preferably greater than approximately 100 meters in length and ideally between 200–300 meter long segments) to be sufficiently lightweight (preferably less than approximately 30 Kgs in weight and ideally no more than approximately 25 Kgs in weight) to be manually transported and laid out by a seismic crew member in a conventional manner. This ability to essentially scamlessly switch between mechanical and manual deployment and retrieval of the cable segments is a major advantage of the present invention over prior art systems. Cable segment lengths shorter than approximately 100 meters could be used with the inventive method, but this would significantly increase the number of segment connectors required and is not typically preferred.

The seismic cable 18 (se FIGS. 2 and 3) consists of a main cable 20 and numerous outlet cables 22, each of which bears several, preferably three, digital seismic sensors 24 that comprise 3-component accelerometers and in a preferred embodiment 3-component magnetometers. The data from these three seismic sensors 24 at each outlet cable 22 (see FIGS. 2 and 3) may be grouped together with digital processing. In FIG. 1, for simplicity reasons, the complete seismic cable is symbolised by a single line.

Seismic sensors 24 may alternatively comprise moving coil geophones that are electrically connected to analogue format to digital format data conversion circuitry. This A/D conversion circuitry may be located within the geophone's housing, near the geophone's housing, or near the main cable 20. While several alternative physical embodiments of these components may be used, it is desirable to convert the data from analogue to digital format before the data is transmitted using the main cable 20 because this allows for the use of a limited number of wire pairs within the main cable, as discussed above.

At the desired seismic survey line 14, the free end of the seismic cable 18 spooled on the drum is laid on the ground. The cable spool vehicle 10 then drives along the seismic survey line 14 while the drum 16 is actively driven to revolve and to actively unspool the seismic cable 18. The seismic cable 18 is laid out upon the ground substantially without any stress or tension, and is neither dragged nor pulled. To achieve this, the speed of the forward movement of the cable spool vehicle 10 is continuously controlled and coordinated with a desired revolving speed of the cable drum 16. During unspooling of the seismic cable 18 the speed of the drum 16 is also controlled and, if necessary, readjusted according to the measured tension on the seismic cable 18. Another factor which may require an adjustment of the speed of the drum 16 is the true geographical position of the cable spool vehicle 10. The preferred embodiment of the cable spool vehicle 10 is equipped with an electronic system that determines its geographical position, ie a Global Positioning system (GPS). Such a GPS system enables the driver or an assistant to monitor the actual geographical position of the vehicle 10 with high accuracy, ie to within a few meters, and allows such positioning data to be recorded. According to the invention, not only the truck positioning data are monitored and recorded as the cable spool vehicle 10 follows the desired seismic survey line 14, but also all geographical positioning data that relate to each laid out seismic sensor group.

An accumulator may be used to retain a portion of the seismic cable 18 that has been unspooled from the drum 16, to provide a buffer between the amount of cable being deployed by the cable spool vehicle 10 and the amount of cable being unspooled from the drum. This type of device could greatly simplify the process of appropriately controlling the speed of the drum 16 while deploying the seismic cable 18 and reduce the need for rapid changes in the speed of the drum.

As also shown in FIG. 1, electronic circuits 28 are placed along the seismic survey line 14. These electronic circuits 28 are so-called signal concentrators that gather and further transmit the digital output signals of the seismic sensors 22 during the seismic data acquisition. These electronic signal concentrators 28 (see also FIG. 2) are placed at standard intervals along the seismic cable 18 and, in preferred embodiments of the seismic cable 18, are implemented as integrated, relatively small parts of the seismic cable 18 which are also wound on the drum 16 on the cable spool vehicle 10.

These signal concentrators 28 may be housed, for instance, in a cylindrical sausage-shaped housing that is approximately 5 centimeters in diameter and 25 centimeters in length and may weigh, for instance, less than 2 kilograms.

Power supply boxes 30, that typically comprise batteries, serve to power up all electronic equipment that is connected to the seismic cable 18, including the seismic sensors 22. Network router units 32 that are linked in a "back-bone" (or "cross-line") scheme allow the seismic cable 18 of one seismic survey line 14 to be connected to the seismic cable of an adjacent seismic survey line and to a seismic data recording vehicle 34. The network router units 32 organise the data transfer between the seismic cables 18 and the cross-lines. FIG. 1 shows that the power supply units 30 are also attached to the seismic cable 18 at standardised intervals. In order to let the aforementioned units 30 and 32 be connected to the seismic cable 18, the cable spool vehicle 10 has to stop at the desired places along the seismic survey line 14. Normally a power supply unit 32 is used at the end of a seismic cable section that equals the cable length that can be spooled on drum 16.

The laying out of seismic cables 18 is continued in one seismic survey line 14 until the cable spool vehicle 10 has completed the particular survey line, as shown in FIG. 1. The laid out seismic cable 18 is then disconnected from the drum 16 and the cable spool vehicle 10 moves to another seismic survey line. In a case where more seismic cable 18 is needed than there is still on its drum 16, the cable spool vehicle 10 may receive a replacement full drum.

When all the cables 18 are in place and interconnected in a seismic spread for a seismic data acquisition, a line test is performed to verify that all sensors, cables and attached electronic units work properly. After replacement of improperly working equipment if necessary, the seismic data acquisition is carried out in a way that in principle is known to those skilled in the art.

One advantage of a seismic data acquisition according to the invention resides in the fact that the digital seismic sensors, the aforementioned 3-component accelerometers, which are used allow the measurement of gravity related signals. Together with measurements from the 3-component magnetometer, this allows a transformation of the actually measured seismic signal components into a desired reference co-ordinate system. The entire signal related data transfer on the seismic cables in the survey spread is digital. The power distribution along the survey lines is performed over relatively long distances that equal about the maximum cable length on the drum of the cable spool vehicle.

FIG. 1 also illustrates how easily the seismic cable 18 can be picked up again according to the invention. In order to do so, the cable spool vehicle 10 (in the drawing the lower vehicle), now with an empty drum 16, is moved to a seismic survey line from which the seismic cable 18 is to be removed. In principle, the respooling of the seismic cable 18 on the drum 16 is performed the same way as laying out the seismic cable 18. At each place where power units 30 and network router units 32 are attached to the cable 18, the spool truck 10 stops, and after the disconnection of each unit the cable is connected to the cable that is already spooled on the drum 16 and then wound thereon. A cable test may be run before a cable section is spooled on the drum 16. This allows the identification of defective cable segments and/or sensors that are out of order, so that they can be replaced or removed before spooling. This makes sure that only properly working seismic cable and sensors are on a drum, and that the spool truck may directly lay out the just respooled cable at another place if needed.

The power units 30 and the network router units 32 are generally designed to be connected or disconnected manually by an occupant of the spool truck 10, after the truck has stopped.

Usually more than one cable spool vehicle 10 will be used at once, as shown in FIG. 1. Thus sections of seismic cable 18 which are no longer needed for the seismic survey can be picked while at the same time at a different position another truck 10 may lay out sections of seismic cable 18 required for a following part of the seismic survey.

The segmented nature of the seismic cable 18 allows the seismic cables to be moved "end-on-end". Using this type of method, cable segments are retrieved on one side of a seismic survey line 14 (such as on the right side of FIG. 1) and are deployed on the other side of the same or another seismic survey line 14 (such as on the left side of FIG. 1). This is sometime preferable to retrieving an entire seismic cable 18 and then placing it on the opposite side of the group of seismic cables. A non-segmented acquisition system is incapable of moving the cables end-on-end.

FIGS. 2 and 3 show the seismic cable 18 in more detail. At regular intervals 40, preferably around 50 m, the main cable is equipped with cable take outs 38 that mechanically as well as electrically connect the outlet cables 22 and the seismic sensors 24 to the main cable 20. The take outs 38 allow the quick disconnection of an outlet cable 22 from the main cable 20 if the seismic sensor group has to be replaced or just to be left out. This ensures full liberty to the user to realise various forms of seismic survey lines or seismic spreads. After certain number of take outs 39 along the main cable 20, the electronic signal concentrators 28 are integrated into the seismic cable 18 as shown. Their function as telemetry units has been already described above. The interval 42 is always as odd multiple of the interval 40 between two take outs 38, because this guarantees that signal concentrators 28 are always placed in the middle between two adjacent take outs 38.

Supplemental to the elements already illustrated in FIG. 2, FIG. 3 show that, according to a preferred embodiment of the invention, elastic links or strings 44 are used to make sure that the outlet cable 22 and its seismic sensors 24 lie essentially in close an parallel to the main cable 20. On one had the elasticity of the links 44 allows a deployed outlet cable 22 to lie against and follow the contours of the ground surface for proper acoustical coupling of the seismic sensors 24 to the soil. On the other hand the elastic links 44 keep the outlet cables 22 close to the main cable 20 during any spooling operation. This avoids bulky parts that may hinder easy spooling or that could be torn off or destroyed during spooling operation.

Links 44 can alternatively be omitted and the seismic sensors 24 can be attached more directly to the main cable 20 (for instance by attaching the primary portion of the outlet cables to the main cable 20 and allowing the sensors to pivot about the smaller secondary portions of the output cables).

Instead of wrapping the seismic cable 18 around a single cable drum 16, seismic cable spool vehicle 10 could alternatively use multiple cable drums and could coil or stream the seismic cable into a compartment within the vehicle.

What is claimed is:

1. A land seismic data acquisition method comprising the following steps:
    a) in a desired spread for a seismic data acquisition, selection at least one section of a desired seismic survey line and positioning a cable spool vehicle, which has a cable drum whereon a seismic cable with attached seismic sensors is spooled, at one end of the desired section of seismic survey line and laying a free end of the cable on the ground;
    b) moving the cable spool vehicle along the desired seismic survey line while revolving the drum at a rate dependent upon the speed of movement of the vehicle to let the seismic cable with attached seismic sensors unspool from the drum in such a way that the cable is laid on the ground substantially free of tension; and
    c) transmitting acoustic signals into the ground, acquiring the resulting seismic signals with the seismic sensors, and recording the acquired seismic signals in digital form.

2. The method of claim 1, further comprising, after having finished laying out the seismic cable and attached sensors, stopping the cable spool vehicle and disconnecting the lain out cable from the drum or from cable that still remains on the drum.

3. The method of claim 1, further comprising connecting laid-out seismic cable to at least one other laid-out seismic cable on the same seismic survey line or to another laid-out cable along another desired seismic survey line.

4. The method of claim 1, further comprising continuing to lay out seismic cables as in steps a) and b) to complete the desired seismic spread, and connecting all the cables to seismic data acquisition means, such as data recorder means and/or data processing means, which perform the recording step.

5. The method of claim 1, further comprising driving a cable spool vehicle to a selected seismic cable and disconnecting the selected cable from any adjacent cable and/or from any seismic data acquisition units, and spooling the disconnected cable onto the drum of the seismic spool vehicle while moving the vehicle along the desired seismic survey line at a spooling rate dependent upon the speed of movement of the vehicle.

6. The method of claim 1, wherein a data transfer test is carried out along the seismic cable before it is spooled on the drum.

7. The method of claim 6, wherein the proper function of the seismic sensors is tested together with the data transfer test along the seismic cable.

8. The method of claim 1, wherein the seismic sensors are three-component seismic sensors.

9. The method of claim 1, wherein several cable spool vehicles are used, and at least one of the vehicles lays out a new seismic cable whilst another vehicle respools a different seismic cable.

10. A seismic data acquisition cable that may be mechanically laid out on the ground in a substantially tension free manner and mechanically picked up again in connection with land seismic data acquisition activities, said seismic data acquisition cable comprising:
    a plurality of connected cable segments;
    said cable segments having a plurality of digital seismic sensors;
    said cable segments further having a plurality of outlet cables and cable take outs that electrically connect said digital seismic sensors to said cable segments and allow digital output signals to be transmitted through said cable segments;
    said digital seismic sensors, said outlet cables, and said cable take outs allowing said cable segments to be mechanically deployed and mechanically retrieved without being torn off or destroyed;
    said cable segments are sufficiently lightweight to be transported and laid out by seismic crew members; and
    wherein at least three of said digital seismic sensors are connected to one of said plurality outlet cables.

11. The seismic data acquisition cable according to claim 10, wherein said cable segment are approximately 100 meters in length or greater.

12. The seismic data acquisition cable according to claim 10, wherein said cable segments are approximately 20 kilograms in weight or less.

13. The seismic data acquisition cable according to claim 10, wherein said cable take outs allow said seismic sensors to be quickly disconnected from said cable segments.

14. The seismic data acquisition cable according to claim 10, wherein said seismic sensors comprise 3-component feedback controlled accelerometers that are arranged to produce gravity related signals.

15. The seismic data acquisition cable according to claim 14, wherein said seismic sensors are equipped with a 3-component magnetometer having its component axes parallel to component axes of said 3-component accelerometers.

16. The seismic data acquisition cable according to claim 10, further including a signal concentrator, connected to one or more of said cable segments, that gathers and further transmits said digital output signals received from said cable segments.

17. The seismic data acquisition cable according to claim 16, wherein said signal concentrator is an integrated part of one said cable segment and remains connected to said cable segment when said cable segment is mechanically retrieved.

18. The seismic data acquisition cable according to claim 10, further including a power supply box, connected to one or more said cable segments, that provides power to electronic equipment connected to said cable segments.

19. The seismic data acquisition cable according to claim 18, wherein said power supply box is disconnected from said cable segments before said cable segments are mechanically retrieved.

20. The seismic data acquisition cable according to claim 10, further including a cross-line cable and a network router unit, connected to one or more said cable segments, that organizes data transfer between said cable segments and said cross-line cable.

21. The seismic data acquisition cable according to claim 20, wherein said network router unit is disconnected from said cable segments before said cable segments are mechanically retrieved.

22. A cable spool vehicle for use in land seismic data acquisition, the vehicle comprising a drum, and a drum driving mechanism that selectively drives the drum backwards and forwards in order to unspool seismic cable off the drum and to respool seismic cable onto the drum, in which the revolving motion of the drum is controlled and co-ordinated in dependence upon the forward motion of the vehicle.

23. The cable spool vehicle according to claim 22, further comprising means for periodically determining the geographical position of the vehicle and for recording such positions in the form of a vehicle trajectory.

24. The cable spool vehicle according to claim 23, wherein the position determining means comprises Global Positioning System equipment.

25. The cable spool vehicle according to claim 22, further comprising at least one sensor that determines the tension on the seismic cable during the unspooling operation.

26. The cable spool vehicle according to claim 22, wherein the revolving of the drum for unspooling of the seismic cable is also controlled by the geographical position of the vehicle.

* * * * *